United States Patent
Chen et al.

(10) Patent No.: US 9,074,054 B2
(45) Date of Patent: Jul. 7, 2015

(54) METHOD OF MANUFACTURING SOLID-LIQUID-MIXED MATERIAL AND APPLICATION THEREOF

(75) Inventors: George Z. Chen, Nottinghamshire (GB); Xianjun Wei, Wuhan (CN); Xianbo Jin, Wuhan (CN); Linpo Yu, Wuhan (CN); Dihua Wang, Wuhan (CN)

(73) Assignees: THE UNIVERSIY OF NOTTINGHAM, Nottinghamshire (GB); WUHAN UNIVERSITY, Hubei (CN)

( * ) Notice: Subject to any disclaimer, the term of this patent is extended or adjusted under 35 U.S.C. 154(b) by 159 days.

(21) Appl. No.: 13/125,792

(22) PCT Filed: Oct. 25, 2009

(86) PCT No.: PCT/CN2009/074603
§ 371 (c)(1),
(2), (4) Date: Nov. 10, 2011

(87) PCT Pub. No.: WO2010/045886
PCT Pub. Date: Apr. 29, 2010

(65) Prior Publication Data
US 2012/0052285 A1    Mar. 1, 2012

(30) Foreign Application Priority Data
Oct. 24, 2008    (CN) .......................... 2008 1 0171734

(51) Int. Cl.
*B32B 3/26*    (2006.01)
*C08J 3/02*    (2006.01)
(Continued)

(52) U.S. Cl.
CPC .... *C08J 3/02* (2013.01); *C08J 3/11* (2013.01); *C08J 9/283* (2013.01); *C08J 2327/16* (2013.01); *G02F 1/15* (2013.01)

(58) Field of Classification Search
USPC .................... 428/315.5, 315.7; 252/583, 586
See application file for complete search history.

(56) References Cited

U.S. PATENT DOCUMENTS 4,750,817 A * 6/1988 Sammells ..................... 359/270
2005/0221193 A1* 10/2005 Kinouchi et al. ............. 429/306
(Continued)

FOREIGN PATENT DOCUMENTS

| CN | 1566259 A | 1/2005 |
| CN | 101386711 A | 3/2009 |

OTHER PUBLICATIONS

International Search Report and Written Opinion received for PCT Patent Application No. PCT/CN2009/074603 mailed on Feb. 4, 2010, 22 pages (11 Pages of English Translation and 11 pages of Search Report).

(Continued)

*Primary Examiner* — Hai Vo
(74) *Attorney, Agent, or Firm* — Pearne & Gordon LLP

(57) ABSTRACT

The present invention provides a solid-liquid composite material, a manufacturing method and an application of the same. Liquid-phase material, solid-phase material, and solvent are distributed to form a distributed system. The solid-phase material and liquid-phase material in the solvent can be suspensions, emulsions, microemulsions, colloids, or solutions. A portion or all of the solvent is removed to produce the solid-liquid composite material. The liquid-phase material is approximately equal to 1%~80% of the total mass of the solid-liquid composite material. The porosity of the solid-phase material is approximately equal to 10%~80% in the solid-liquid composite material. The specific surface area of the porous material is approximately equal to 50~2000 cm$^2$/cm$^3$. The field-chromatic material is added to the solid-liquid composite material to form a field-chromatic device.

6 Claims, 3 Drawing Sheets

(51) Int. Cl.
*C08J 3/11* (2006.01)
*C08J 9/28* (2006.01)
*G02F 1/15* (2006.01)

(56) References Cited

U.S. PATENT DOCUMENTS

2005/0231785 A1    10/2005  Oh et al.
2009/0264308 A1*   10/2009  Broer et al. ............... 506/9

OTHER PUBLICATIONS

International Preliminary Report on Patentability received for PCT Patent Application No. PCT/CN2009/074603 issued on Apr. 26, 2011, 14 pages (7 pages of English Translation and 7 pages of IPRP).
Wei et al., "Thermo-Solvatochromism of Chloro-Nickel Complexes in 1-Hydroxyalkyl-3-Methyl-Imidazolium Cation Based Ionic Liquids", Green Chemistry, vol. 10, 2008, pp. 296-305.
Peon et al., "Characterization of PVdF(HFP) Gel Electrolytes Based on 1-(2-Hydroxyethyl)-3-methyl Imidazolium Ionic Liquids", The Journal of Physical Chemistry B, vol. 109, No. 38, 2005, pp. 17928-17935.
Salissou, Y. et. al. "Pressure/mass method to measure open porosity of porous solids" IN: AIP Journal of Applied Physics, 101, cover page and pp. 124913-1 to 124913-7 (2007).
Chandra, Amita et. al., "Properties and morphology of highly conducting inorganic solid—liquid composites based on AgCl" IN: ELSEVIER Solid State Ionics, 148 (2002) pp. 153-158.
Supplementary European Search Report for EP 09 82 1607, dated Nov. 9, 2012, pp. 1-4 and annex page.
Gevers, L.E.M. et. al. "A novel method to prepare porous membranes/polymers with easy control over porosity and increased compaction resistance" IN: ELSEVIER Desalination 199 (2006) pp. 34-36.
Palacio, L. et. al. "Porosity measurements by a gas penetration method and other techniques applied to membrane characterization" IN: ELSEVIER Thin Solid Films 348 (1999) pp. 22-29.
Puri, Balwant Rai et. al. "Ethylene Glycol Retention Method for Estimating Specific Surface Area of Adsorbent Carbons" IN: Carbon vol. 17 (1979) pp. 121-123.
Rouquerol, J. et. al. "Recommendation for the Characterization for Porous Solids" IN: International Union of Pure and Applied Chemistry, Pure & Applied Chemistry, vol. 66, No. 8 (1994) pp. 1739-1758.
Shi, Zhi-Guo et. al. "A template method to control the shape and porosity of carbon materials" IN: ELSEVIER Carbon 42 (2004) pp. 1677-1682.
Snedden, Peter et. al. "Cross-Linked Polymer-Ionic Liquid Composite Materials" IN: Macromolecules 36 (2003) pp. 4549-4556.
Wei, Xianjun et. al. "Thermo-solvatochromism of chloro-nickel complexes in 1-hydroxyalkyl-3-methyl-imidazolium cation based ionic liquids" IN: Green Chemistry 10 (2008) pp. 296-305.
Yeon, Sun-Hwa, et. al. "Characterization of PVdF(HFP) Gel Electrolytes Based on 1-(2-Hydroxyethyl)-3-methyl Imidazolium Ionic Liquids" IN: J. Phys. Chem. B 109 (2005) pp. 17928-17935.

* cited by examiner

METHOD OF MANUFACTURING SOLID-LIQUID-MIXED MATERIAL AND APPLICATION THEREOF

CROSS REFERENCE TO RELATED APPLICATIONS

This application is a U.S. National Phase patent application of PCT/CN2009/074603, filed Oct. 25, 2009, which claims priority to Chinese patent application Serial No. 200810171734.0 filed Oct. 24, 2008, all of which are hereby incorporated by reference in the present disclosure in their entirety.

BACKGROUND OF THE INVENTION

1. Field of the Invention

The invention relates to a solid-liquid composite material, a method of manufacturing the solid-liquid composite material, and an application of the sold-liquid composite material in the manufacture of field-chromatic devices, which belongs to the field of chemistry.

2. Description of the Related Art

Since liquid is mobile, and solutes contained in a liquid usually exist in form of molecules or ions, and many physical and chemical processes are usually conducted in liquid-phase material at a higher speed, therefore, the solution process is the one of the most important processes in physical and chemical processes.

Sometimes, we may need to increase the specific surface area of a liquid material in the same way as increasing the specific surface area of the solid material. To increase the specific surface area of the solid material, the distribution of the solid material is usually involved, and the target solid material is distributed on inside and outside surfaces of a porous material with a bigger specific surface area so as to increase the specific surface area of the target solid material. However, the distribution of a liquid material basically can utilize a similar method to distribute the liquid material onto both inside and outside surfaces of a porous material with a bigger specific surface area. The solid-liquid composite material can further increase the efficiencies of many physical and chemical processes, but the stability of the composite material is a problem remains to be solved.

Sometimes, we may need to design devices of a specific morphology by using liquid materials in the same way as by using solid materials. In situations like this, the liquid material can be sealed in a solid container of a specific morphology. But if it is necessary to exchange matters or energies with the outside for using the devices, the aforementioned design will impede or retard the exchange process of the matters or energies. In situation like this, exposing the liquid material in the environment is undoubtedly a better choice.

The choices of chromatic materials used for producing some field-chromatic (such as thermochromatic, photochromatic, electrochromatic or magetochromatic) devices usually include inorganic materials or solid organic materials, such as the molybdates disclosed in R.O.C. Patent No. CN 03147534.5, but the solid inorganic compound usually has a disadvantage of a slow response of color change. For some systems of metal complexes in water and organic solvents, the change of the coordination structure can cause a color change in certain temperature and lighting conditions. But it is difficult for the systems to produce a device. In addition, water and solvent have the disadvantages of high volatility and a low stability. If ion liquids can be distributed on surfaces of a solid carrier effectively, it means a lot to design and manufacture an ion liquid based field-chromatic device.

SUMMARY OF THE INVENTION

The purpose of the present invention is to provide a solid-liquid composite material, and a manufacturing method and an application of the solid-liquid composite material. The liquid-phase material of the solid-liquid composite material can be distributed onto the inside and outside surfaces of a porous solid material uniformly and stably. The present invention also provides the application of the solid-liquid composite material for the manufacture of a field-chromatic device.

In an embodiment of the present invention, the liquid-phase tiny droplets of the solid-liquid composite material are combined with the inside and outside surfaces of the solid-phase material or exist in solid-phase nanopores. The liquid-phase material is approximately 1%~80% of the total mass of the solid-liquid composite material. The porosity of the solid-phase material is approximately 10%~80% in the solid-liquid composite material. The porous material has a specific surface area per volume of approximately 50~2000 $cm^2/cm^3$. The liquid-phase tiny droplets of the solid-liquid composite material are combined with the inside and outside surfaces of the solid-phase material or exist in solid-phase nanopores.

The solid-liquid composite material is manufactured according to the following steps: Solid-phase material, liquid-phase material, and solvent are distributed to form a distributed system. In the distributed system, the mass of the solid-phase material and liquid-phase material equals to 5%~80% of the total mass. The solid-phase material and liquid-phase material in the solvent may be a suspension, emulsion, microemulsion, colloid, or solution. And a portion or all of the solvent is removed to obtain the solid-liquid composite material. The solvent may be water, oil, alcohol, ketone, ether, amine, nitrile, sulfone, or a combination of the above.

The aforementioned liquid is an ion liquid, liquid crystal, colloid, organic or inorganic solvent with a vapor pressure less than 0.1 atm, or a mixed liquid which is a combination of the above. The ion liquid is an imidazole type ion liquid, pyridine type ion liquid, quaternary ammonium type ion liquid, or mixed liquid which is a combination of the above.

The solid-phase material may be an organic polymer, inorganic material, metal, one of the organic materials, or mixed solid material which is a combination of the above. The organic polymer may be a carbonchain polymer (wherein the main chain is carbon), heterochain polymer (wherein the main chain includes carbon and other atoms), element organic polymer (wherein the main chain is silicon and something else), or a combination of the above.

The solid-liquid composite material according to the present invention exists in the nanopores of the solid-phase material or tiny droplets distributed on the surface of the solid-phase material. A gas-liquid balance can be achieve easily with the materials (such as water) in the environment (such as the common air environment) so that the liquid-phase material can maintain a material balance easily even if the liquid-phase material is exposed in the environment, so as to achieve a higher stability.

The solid-liquid composite material of the present invention can be applied to the manufacture of field-chromatic devices. The composite material can be used to form a field-chromatic device in the technical solution tape-casting, casting, mold pressing arts by adding thermal-, light-, electro-, magnetic-chromatic material in the solid-liquid composite material. The morphology of the device may be film, sphere, or rectangle. The liquid-phase material is preferably a mixed melt material of the ion liquid and inorganic salt. The solid-phase material preferably may be organic polymer.

The solid-liquid composite material of the present invention can be used to manufacture a thermochromatic or photochromatic device. The liquid for the thermochromatic or photochromatic device may be an ion liquid, organic salt, inorganic salt, or a mixed liquid which is a combination of the above. The inorganic salt is preferably the coordination compound. The concentration of the organic salt or inorganic salt in the ion liquid is 1%~90%. The ratio of ion liquid to solid-phase material in mass is 1:20~4:1.

The advantages of the present invention include an easy access of the solid-phase material and liquid-phase material materials, a simple manufacture is simple, and a stable liquid-phase material of the solid-liquid composite material in the environment so that the field-chromatic device manufactured by using the solid-liquid composite material is useful in practical applications.

DETAILED DESCRIPTION OF THE PREFERRED EMBODIMENTS

Figure 1:
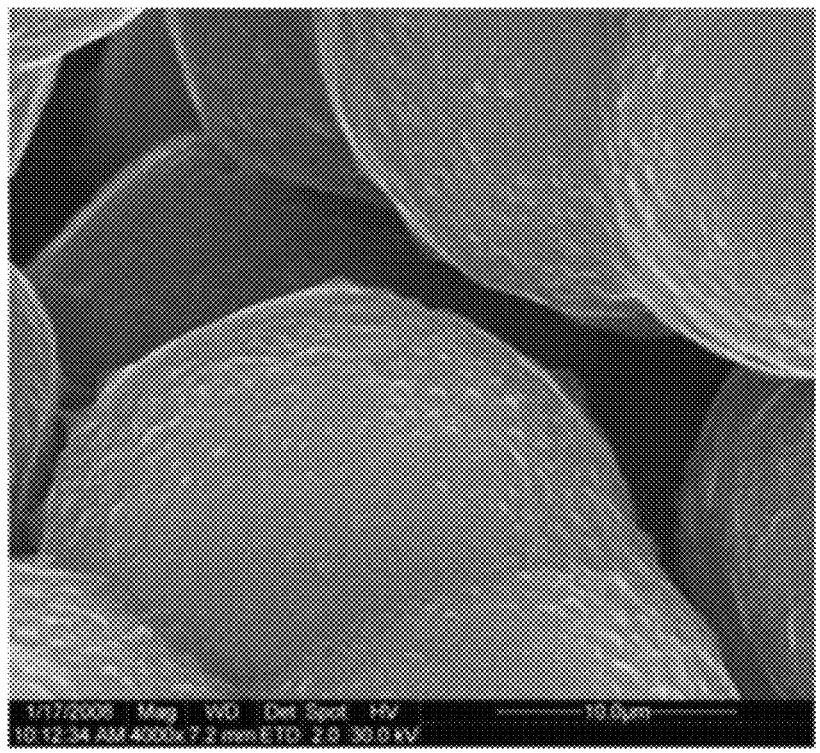
FIG. 1 is the SEM figure of the solid-liquid composite material.

In an embodiment of the present invention, the solid-phase material is Polyvinylidene fluoride PVDF, and the liquid-phase material is $C_3OHmimBF_4$ and the field-chromatic material $[bmim]_2NiCl_4$. PVDF 0.21 g, $C_3OHmimBF_4$ 0.02~0.30 g and $[bmim]_2NiCl_4$ 0.001~0.04 g are added to the container with DMF 5.5 g, and then the mixed system is heated in the range of 50° C.~75° C. to be melt to form transparent solution which is the solid-liquid composite material. The pore ratio of the solid-phase material in the solid-liquid composite material is 20%~80%, and the specific surface area is 300~1500 $cm^2/cm^3$. The next, the solution is cast in a flat-bottom container to be baked in the temperature range 50° C.~75° C. in a baking oven to form a film with the area 10~40 $cm^2$ and thickness 0.1~1 mm. The provided film becomes white, blue-green, blue at 25° C., 45° C., and 75° C. respectively. The thermochromatic character is performed. The SEM figure of the solid-liquid composite material is shown in FIG. 1.

Figure 2:
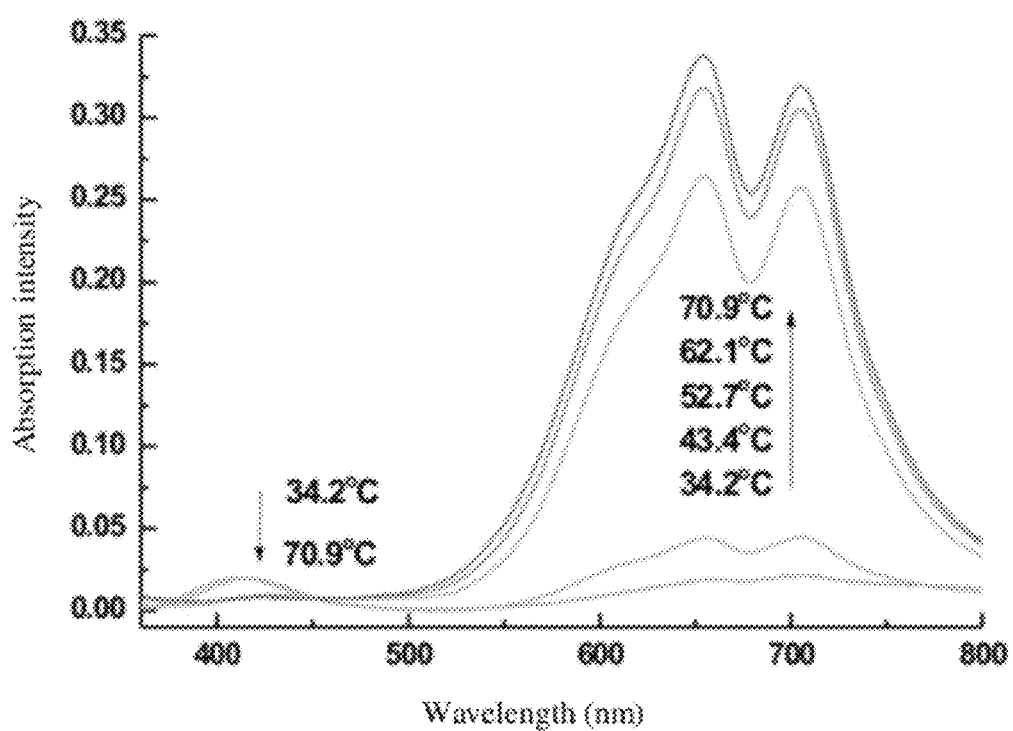
FIG. 2 is a spectrum chart of a visible light at different temperatures.

In another embodiment of the present invention, the solid-phase material is Polyvinylidene fluoride PVDF, and the liquid-phase material is $C_3OHmimBF_4$ and the field-chromatic material $[bmim]_2NiCl_4$. PVDF 0.21 g, $C_3OHmimBF_4$ 0.02~0.20 g and $[bmim]_2NiCl_4$ 0.001~0.02 g are added to the container with DMSO 5.5 g, and then the mixed system is heated in the range of 50° C.~75° C. to be melt to form transparent solution which is the solid-liquid composite material. The pore ratio of the solid-phase material in the solid-liquid composite material is 20%~60%, and the specific surface area is 300~1500 $cm^2/cm^3$. The next, the solution is cast in a flat-bottom container to be baked in the temperature range 50° C.~75° C. in a baking oven to form a film with the area 10~40 $cm^2$ and thickness 0.1~1 mm. The provided film is white without sun shine, and blue under the Sun. It shows the sensitivity to the sun shine. The visible spectrum at various temperatures is shown in FIG. 2.

Figure 3:
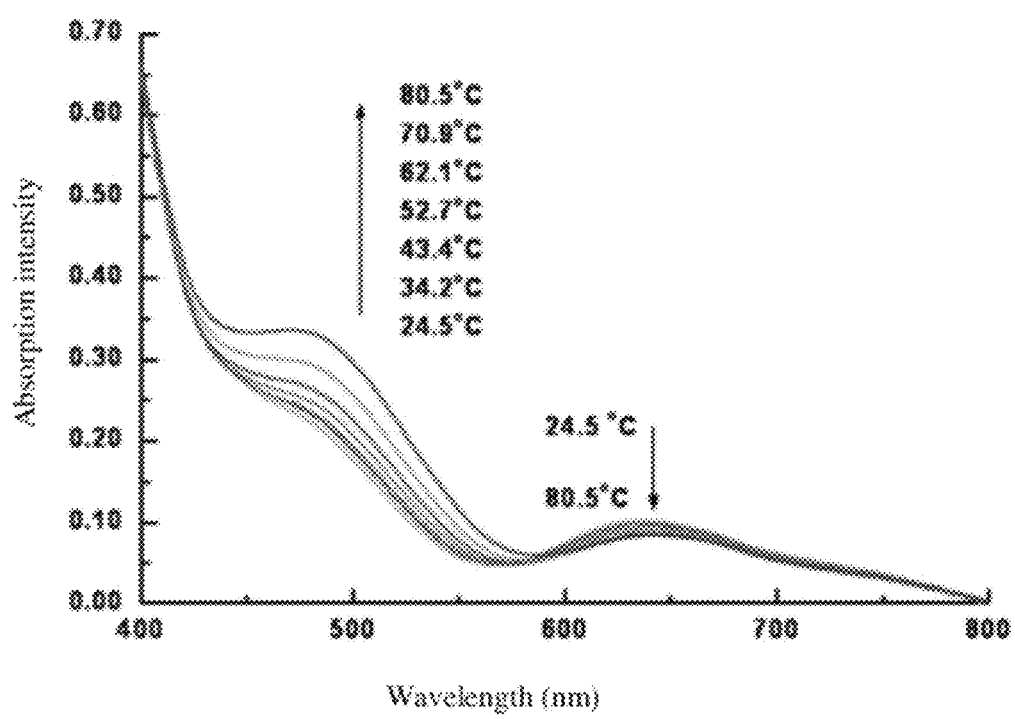
FIG. 3 is a spectrum chart of a visible light at different temperatures of the solid-liquid composite film.

In an embodiment of the present invention, the solid-phase material is PVDF, and the liquid-phase material is $C_3OHmimBF_4$ and the field-chromatic material $[Ni(Me_4enacac)]ClO_4$. PVDF 0.21 g, $C_3OHmimBF_4$ 0.05~0.30 g and $[Ni(Me_4enacac)]ClO_4$ 0.01~0.15 g are added to the container with DMF 5.5 g, and then the mixed system is heated in the range of 50° C.~75° C. to be melt to form transparent solution which is the solid-liquid composite material. The pore ratio of the solid-phase material in the solid-liquid composite material is 20%~60%, and the specific surface area is 200~1000 $cm^2/cm^3$. The next, the solution is cast in a flat-bottom container to be baked in the temperature range 50° C.~75° C. in a baking oven to form a film with the area 10~40 $cm^2$ and thickness 0.1~1 mm. The provided film is green at 25° C., dark red at 75° C. in the air. The thermochromatic character is performed. The visible spectrum at various temperatures for the solid-liquid composite film is shown in FIG. 3.

What is claimed is:

1. A solid-liquid composite material, comprising:
(a) a liquid-phase material comprising tiny droplets combined with an inside surface and an outside surface of a solid-phase material or existing in solid-phase nanopores, wherein the liquid-phase material has a mass approximately ranging from 1% to 80% of the total mass of the solid-liquid composite material, and the porosity of the solid-phase material is approximately ranging from 10% to 80%, and the solid phase material has a specific surface area approximately equal to ranging from 50 to 2000 $cm^2/cm^3$, wherein the liquid-phase material is an ion liquid, a liquid crystal, or a combination thereof, and wherein the liquid-phase material has a vapor pressure less than 0.1 atm, and the solid-phase material is an organic polymer, wherein the organic polymer is a carbonchain polymer, a heterochain polymer, an element organic polymer, or any combination thereof; and
(b) a field chromatic material, wherein the field chromatic material is $[bmim]_2NiCl_4$, or $[Ni(Me_4enacac)]ClO_4$.

2. The solid-liquid composite material as recited in claim 1, wherein the tiny droplets of the liquid-phase material are combined with the inside or outside surfaces of the solid-phase material uniformly, or exist in the nanopores of the solid-phase material uniformly.

3. The solid-liquid composite material as recited in claim 1, wherein the liquid-phase material is $C_3OHmimBF_4$.

4. The solid-liquid composite material as recited in claim 1, wherein the liquid-phase material is an ion liquid, wherein the ion liquid is an imidazole type ion liquid, pyridine type ion liquid, quaternary ammonium type ion liquid, or any combination thereof.

5. A manufacturing method for the solid-liquid composite material as recited in claim 1, comprising:
providing the liquid phase material, the solid phase material, and the field chromatic material;
distributing the solid-phase material, the liquid-phase material, the field chromatic material, and a solvent to form a distributed system, and the solid-phase material and the liquid-phase material in the solvent are suspension, emulsion, microemulsion, colloid, or solution; and
removing a portion or all of the solvent to produce the solid-liquid composite material, wherein the solvent is water, oil, alcohol, ketone, ether, amine, nitrile, sulfone, or a combination thereof.

6. The method as recited in claim 5, wherein the distributed system comprises an auxiliary product, and the auxiliary product comprises a binder or/and a pore former.

* * * * *

UNITED STATES PATENT AND TRADEMARK OFFICE
CERTIFICATE OF CORRECTION

| | |
|---|---|
| PATENT NO. | : 9,074,054 B2 |
| APPLICATION NO. | : 13/125792 |
| DATED | : July 7, 2015 |
| INVENTOR(S) | : George Z. Chen |

It is certified that error appears in the above-identified patent and that said Letters Patent is hereby corrected as shown below:

In the claims,

Claim 1, line 32

"A solid-liquid composite material, comprising:
(a) a liquid-phase material comprising tiny droplets combined with an inside surface and an outside surface of a solid-phase material or existing in solid-phase nanopores, wherein the liquid-phase material has a mass approximately ranging from 1% to 80% of the total mass of the solid-liquid composite material, and the porosity of the solid-phase material is approximately ranging from 10% to 80%, and the solid phase material has a specific surface area approximately equal to ranging from 50 to 2000 cm2/cm3, wherein the liquid-phase material is an ion liquid, a liquid crystal, or a combination thereof, and wherein the liquid-phase material has a vapor pressure less than 0.1 atm, and the solid-phase material is an organic polymer, wherein the organic polymer is a carbonchain polymer, a heterochain polymer, an element organic polymer, or any combination thereof; and
(b) a field chromatic material, wherein the field chromatic material is [bmim]2NiCl4, or [Ni(Me4enacac)]ClO4."

should read

-- A solid-liquid composite material, comprising:
(a) a liquid-phase material comprising tiny droplets combined with an inside surface and an outside surface of a solid-phase material or existing in solid-phase nanopores, wherein the liquid-phase material has a mass approximately ranging from 1% to 80% of the total mass of the solid-liquid composite material, and the porosity of the solid-phase material is approximately ranging from 10% to 80%, and the solid phase material has a specific surface area approximately ranging from 50 to 2000 cm2/cm3, wherein the liquid-phase material is an ion liquid, a liquid crystal, or a combination thereof, and wherein the liquid-phase material has a vapor pressure less than 0.1 atm, and the solid-phase material is an organic polymer, wherein the organic polymer is a carbonchain polymer, a heterochain polymer, an element organic polymer, or any combination thereof; and Signed and Sealed this
Fifth Day of January, 2016

Michelle K. Lee
*Director of the United States Patent and Trademark Office*

(b) a field chromatic material, wherein the field chromatic material is [bmim]2NiCl4, or [Ni(Me4enacac)]ClO4.--